L. C. GRACY.
AUTOMOBILE JACK AND TIRE REST.
APPLICATION FILED OCT. 6, 1910.
981,852.
Patented Jan. 17, 1911.
3 SHEETS—SHEET 1.
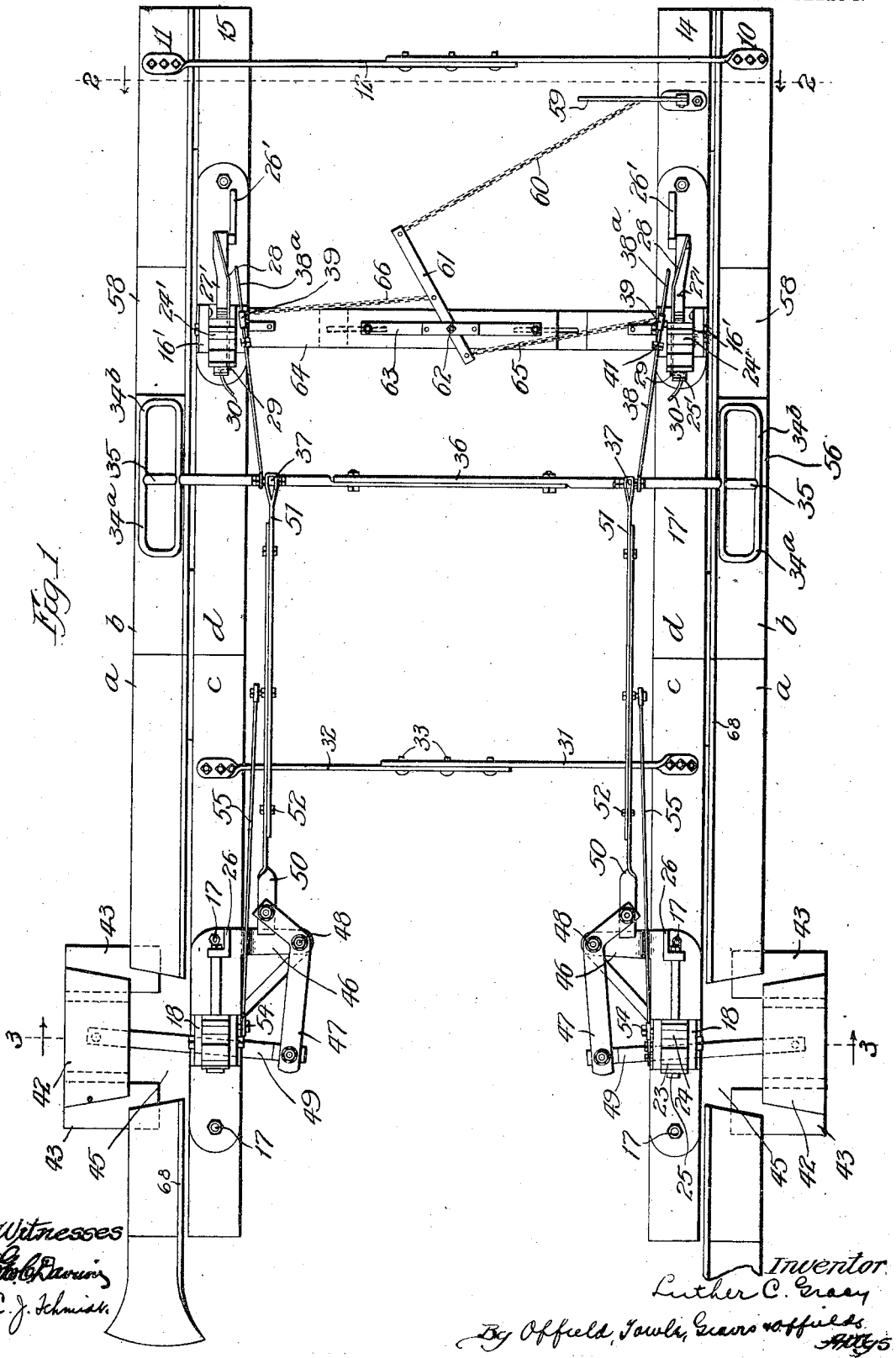

L. C. GRACY.
AUTOMOBILE JACK AND TIRE REST.
APPLICATION FILED OCT. 6, 1910.
981,852.
Patented Jan. 17, 1911.
3 SHEETS—SHEET 2.
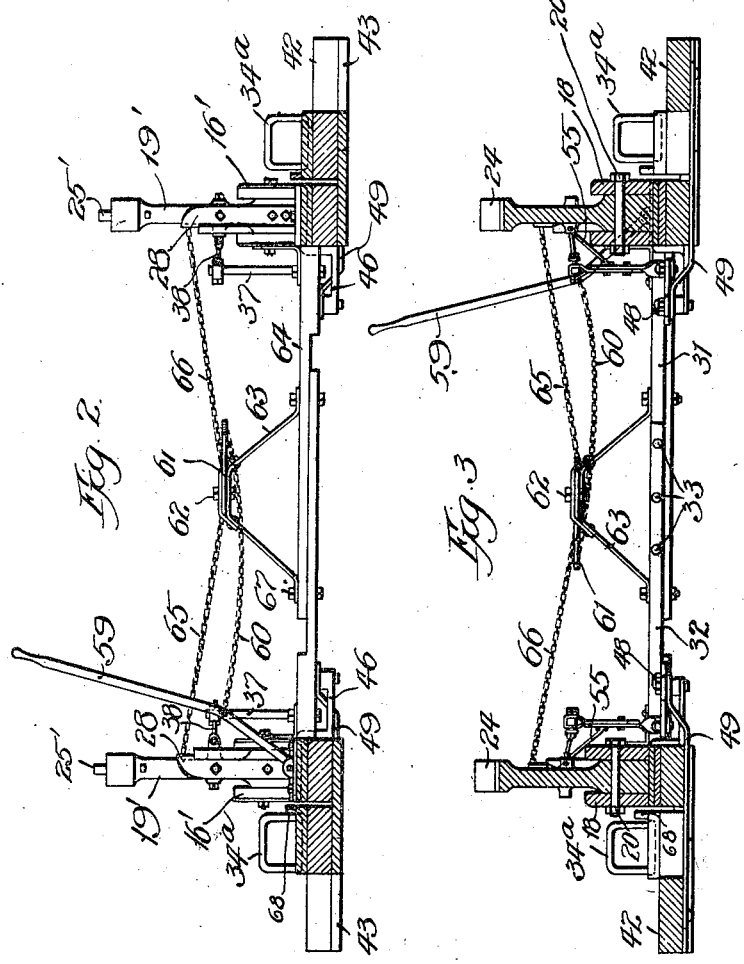
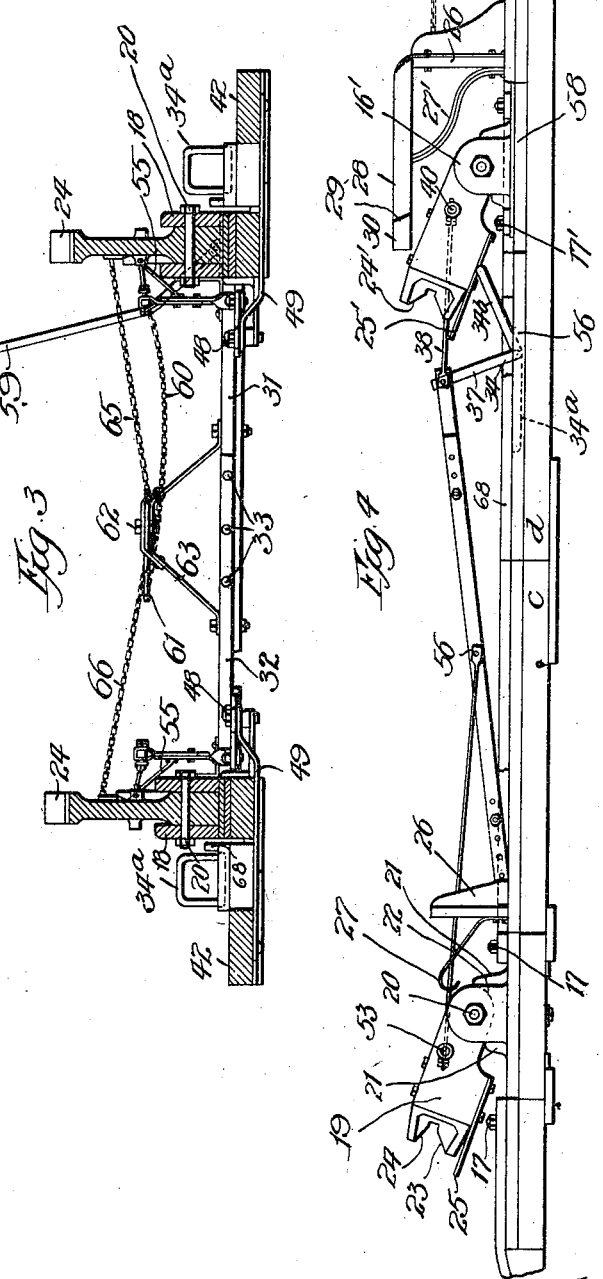
Witnesses:
Inventor
Luther C. Gracy
By Offield, Towle, Graves & Offield
Attys

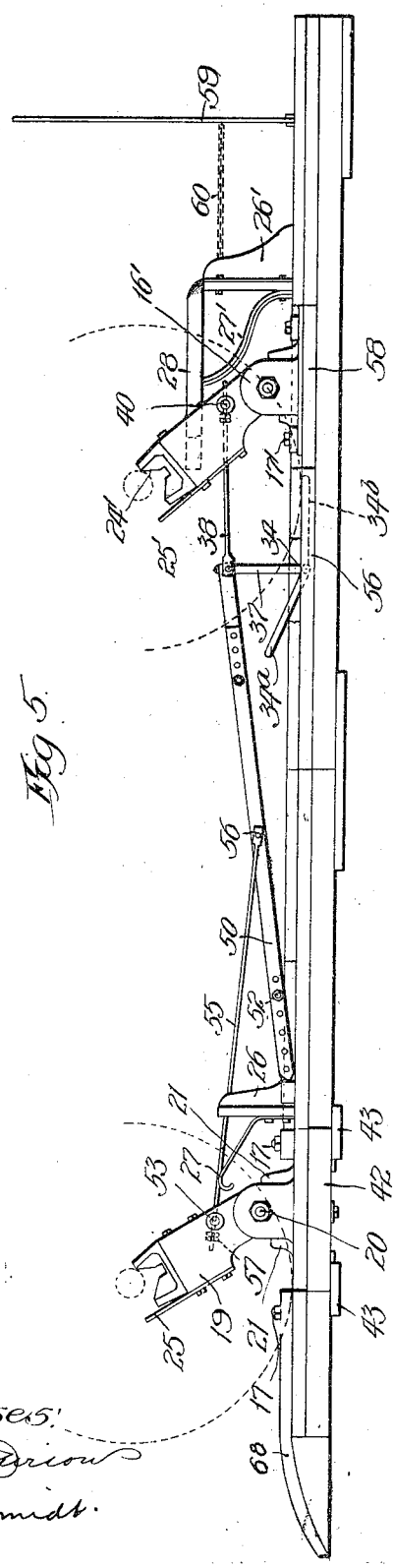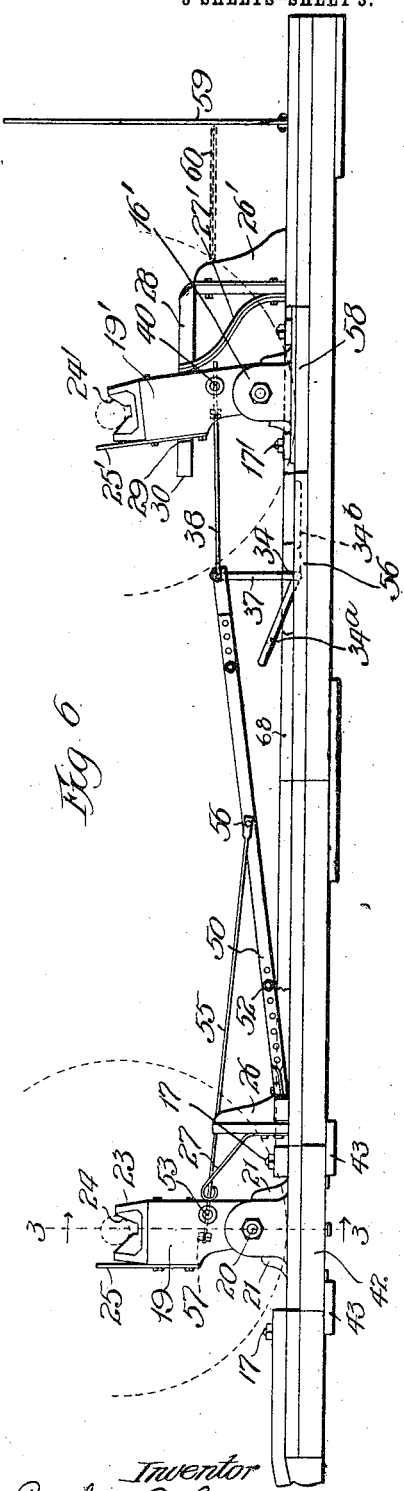

UNITED STATES PATENT OFFICE.

LUTHER C. GRACY, OF GAINESVILLE, FLORIDA.

AUTOMOBILE JACK AND TIRE-REST.

981,852.  Specification of Letters Patent.  Patented Jan. 17, 1911.

Application filed October 6, 1910. Serial No. 585,614.

*To all whom it may concern:*

Be it known that I, LUTHER C. GRACY, residing at Gainesville, in the county of Alachua and State of Florida, have invented certain new and useful Improvements in Automobile Jacks and Tire-Rests, of which the following is a full, clear, and precise specification.

My invention relates to automatic automobile jack and tire rest, and contemplates various improved features of construction, arrangement and operation.

Among the important objects of my invention are to provide mechanism for receiving an automobile and for suspending it to free the wheels without jarring and straining the automobile parts, particularly the springs thereof; to provide mechanism in which a plurality of jacks are automatically controlled by the movement of the automobile to engage with the axles thereof to suspend the automobile to clear the wheels from the floor; to provide construction and arrangement for accomplishing such simultaneous suspension of the axles without raising the level of the axles after being received by the jack members; to provide means for cushioning the engagement of the automobile with the jack members; to provide improved release mechanism for releasing the automobile from the jack members; to provide improved means for automatically removing track sections from below the automobile wheels to increase the clearance of the wheels; to provide improved means for adjusting the mechanism for receiving vehicles of varying wheel base and varying wheel diameter; and in general for providing improved construction and arrangement in mechanism of the class referred to.

The nature of my invention will be clearly understood from the following specification and accompanying drawings, showing one embodiment thereof.

In said drawings Figure 1 is a plan view of the automatic jack mechanism, Fig. 2 is a sectional view taken on plane 2—2, Fig. 1, Fig. 3 is a sectional view taken on plane 3—3, Fig. 1, Fig. 4 is a side elevational view, showing the jack members in initial position, Fig. 5 is a similar view, showing the jack members and controlling mechanism in an intermediate position, and Fig. 6 is a similar view, showing the jack members in final position for supporting an automobile.

The supporting structure for the device comprises two track members 10 and 11 spaced to gage by suitable cross bars 12, the entrance ends of the track members being each provided with an inclined approach 13. Each track member is divided into two parts $a$ and $b$, so that each track member may be longitudinally adjustable for automobiles of different wheel base length. Within the track members and parallel therewith are the jack supporting bases 14 and 15, each divided into two parts $c$ and $d$ to be longitudinally adjustable for automobiles of different wheel base length. At the entrance end each part $c$ of the jack supporting bases supports a bearing frame 16, each frame being secured by means of vertical bolts 17, which extend upwardly from the base member $c$ and which are of sufficient length so that the bearing frame can be blocked up to adjust for automobiles having wheels of greater diameter. Bearing lugs 18 extend upwardly from each bearing frame and receive between them the lower end of a jack block 19, which is pivoted to swing between the lugs of a pivot bolt 20 extending through the lugs and the block. The sides 21 of the lugs are connected a distance upwardly from the base, so that an oil well 22 is formed for containing oil to lubricate the engagement of the block with the lugs. The blocks may be of wood or of metal, and the end thereof at its front and side edges has extensions 23 forming a pocket for containing a block 24 preferably of wood and suitably notched in its top surface to form a seat for receiving the rear axle of a vehicle. Secured to the outer edge of the block is a guard plate 25 which extends a distance upwardly beyond the corresponding extension 23 and beyond the block 24. At its inner end a post 26 extends upwardly from the inner end of the bearing frame post and supports a bumper spring 27 for receiving the block after it has received the axle and to yieldingly brake further swing of the block after it reaches its uppermost position. At the other end of each jack supporting base and mounted on the part $b$ thereof is also a bearing frame 16′ constructed in practically the same manner as the bearing frame 16 at the entrance end, and this bearing frame supports a jack block 19′ constructed in practically the same manner as jack block 19 and supporting an axle block 24′ and a guard plate 25′. The bumper spring 27′ extending from post 26′ to engage the jack block 19′ is, however, preferably heavier than the spring 27. The post 26' further supports a spring catch bar 28 having a section 29 at its end bent outwardly at right angles to the bar and having the curved guide section 30 extending outwardly from the end of section 29. The spring bar is adjusted so that the guide end 30 is in the path of the block 19' when the block is raised, so that when the front edge of the block passes section 29 the bar 28 will spring against the block to carry the section 29 in front of the side of the block, so that the block will be locked in its raised position against the force of spring 27' and against the weight of the vehicle whose axle rests on the block.

The tread gage of the automobile wheels is generally constant, and the bars 12 which connect together the track sections 10 and 11 need not, therefore, be adjustable. However, the arrangement of various parts with reference to the axle vary in different automobiles. For example, in some automobiles the axle sections adjacent the wheels are free of other parts, and the jack blocks can engage with the axles directly adjacent the wheels, but in other automobiles the brake wheel or other parts are mounted on or near the sections of the axles adjacent the walls, and in such cases the jack blocks must be adjusted to avoid these parts, usually by being set inwardly to engage the axles inside of such parts. The jack block base members 14 and 15 are, therefore, adapted to be adjustable toward and away from each other, and preferably by means of bars 31 and 32 secured to and extending toward each other from the bases 14 and 15 to overlap at their inner ends and to be rigidly connected together by bolts 33 after adjustment of the base members has been effected, the jack blocks being then all adjusted an equal distance either inwardly or outwardly to engage the axles at corresponding points with reference to the wheels in order to more evenly balance the vehicle when the jack blocks are raised. Any number of adjustable cross bars 31 and 32 can be provided, and transverse adjustment of the jack blocks with reference to the vehicle axles can be readily made, and the jack blocks rigidly supported in adjusted position.

Adjacent and in advance of each jack block 19' a rock frame 34 is provided on the respective track members 10 and 11, the entrance and exit sections 34ª and 34ᵇ respectively extending at an angle with each other form the transverse pivot line 35, the opposite rock frames being secured together by a shaft 36 forming a continuation of the pivot lines 35, so that the frames will rock in unison. Inwardly of and adjacent each rock frame the shaft carries an upstanding lever arm 37 to which is pivoted the inner end of a rod 38, whose outer end 38ª has slidable engagement in a sleeve 39 supported at the end of a bolt 40 having pivotal engagement in the bearing block 19'. The outer end 38ª is threaded, and between the sleeve 39 and lever 37 this end carries abutment nuts 41 adapted to be adjusted along the rod 38 and to be locked together after such adjustment to form a rigid abutment.

Below each bearing frame 16 the track member has a removable section 42 which carries slide plates 43 at its edges for engaging in slideways 44 provided in the track edges adjacent the removable section, so that this section can assume an inward position to make the track continuous or to be slid to an out position to leave the clearance opening 45 below a corresponding automobile wheel when the automobile is raised on the jacks. From the inner end of the base of each bearing frame 16 a bearing extension 46 extends horizontally inwardly, and to its inner end a crank lever 47 is pivoted at its bend by pivot screw 48. A connecting bar 49 is pivoted at its inner end to the outer end of the bell crank lever and at its outer end is pivoted to the removable section 42, so that upon swinging of the bell crank lever the removable section will be slid either to an inner or outer position. The inner arm of the bell crank lever has pivoted to its end a connecting bar section 50, and a companion connecting bar section 51 pivots to the end of the corresponding lever 37 extending from the rock member shaft 36, the inner ends of the connecting bar members overlapping and secured together by bolts 52, a number of bolt holes being provided in each section so that the connecting bar is longitudinally adjustable in accordance with the adjustment of the track members to compensate for varying wheel base distances, such adjustment of the track members being effected by separating or bringing together the members c and d of the track sections, as already described before.

Extending through each jack block 19 is a pivot screw 53, whose inner end carries a sleeve 54, through which slidably passes the outer end of a rod 55, whose inner end is pivotally connected at 56 with the corresponding connecting bars 50, 51, the outer end of the rod 55 being threaded to receive abutment nuts 57, these ends engaging the rod outside of the sleeve 54.

With the arrangement above described, when the frames 34 are rocked the shaft 36 will be rotated and the levers 37 swung to longitudinally shift the rods 38 and 55 and the connecting bars 50, 51. Clockwise rotation of shaft 36 will result in engagement of abutment nuts 41 and 57 with sleeves 39 and 54 respectively to cause raising of the jack blocks 19 and 19' respectively, while counter clockwise rotation of shaft 36 will merely withdraw the rods 38 and 55 without directly causing swing of the jack blocks. During clockwise rotation of shaft 36 the resulting longitudinal movement of the bars 50, 51 will cause swing of the bell crank levers 47, which results in the removable sections 42 being displaced outwardly to leave the clearance openings 45, while counter clockwise rotation of shaft 36 will cause the bell crank levers to swing in the opposite direction to draw in the removable sections 42 of the track members to make the track members continuous.

The rock frames are actuated by the front wheels of the automobile passing thereover. In order to prevent bumping, a pocket 56 is provided in each track frame for receiving the rock frame, so that when these frames are engaged by the wheels their top surfaces will be in line with the top surface of the track members, and the wheels can thus pass smoothly over the rock frames.

Referring to Fig. 4, the entrance ends 34ª of the rock frames are normally down and the exit ends 34ᵇ are up, and the jack blocks are in their lowermost position, and the removable sections 42 are in place in the track to form a part thereof. The automobile to be jacked up is now run up over the approaches 13 and onto the track members, and the front wheels will pass smoothly over the track members adjacent the jack blocks 19 as the removable sections 42 are in place within the track. The front wheels then pass over the entrance ends 34ª of the rock frames and then against the exit ends 34ᵇ of these frames, such engagement with the exit ends causing clockwise rocking of the frames and rotation of shaft 36, such rotation resulting directly in shifting outwardly of the removable sections 42 to leave the clearance openings 45 over which the rear wheels will eventually be supported. Also, upon such rotation of the rock members the rods 38 and 55 will be shifted inwardly and the jam nuts 41 and 57 engaging against sleeves 39 and 54 respectively will effect upward swing of the jack blocks, the resulting positions of the sections 42 and of the jack blocks being that shown in Fig. 5. In this position also the rear wheels of the automobile will be at the brink of the openings 45 left in the track by the shifted out sections 42, and the front wheels will be at the brink of clearance pockets 58 which are permanently provided in the track members adjacent the jack blocks 19'. As the wheels moved over the track and actuated the rock frames the jack blocks were swung gradually upwardly to follow the axles, and as shown in Fig. 5, the axles have just passed over and by the guard plates 25 and 25' on the jack plates and are in position over the bearing block 24 and 24', but not in bearing engagement with these blocks. Now, as the vehicle, due to its momentum, moves farther along the wheels will tend to drop into the clearance spaces 45 and 58, but during such further movement the axles will engage with the inner faces of the blocks 24 and 24', and the jack blocks will be carried along, so that the blocks 24 and 24' and the axles are simultaneously carried toward each other, and when the wheels reach the central position over the clearance spaces 45 and 58 the jack blocks will be in rigid engagement with the axles to take the weight of the vehicle before the wheels can drop any distance into the spaces 45 and 58. This final position is illustrated in Fig. 6. When the rear axle jack blocks reach vertical position and the front axle blocks reach their highest position the bumper springs 27 and 27' will have yieldingly braked further swing of the jack blocks, and the spring latches 28 will have slipped into locking position behind the front axle jack blocks, and the vehicle will come to rest fully supported on the jack blocks with the wheels extending only a slight distance into the clearance spaces 45 and 58, so that the wheels will be entirely free.

In prior devices the vehicle runs upon the track and the axles abruptly encounter the inclined jack blocks, so that the vehicle is suddenly jerked upwardly onto the jack blocks, this abrupt engagement being of course a severe strain on the vehicle, particularly on the springs. In my arrangement there is practically no bodily upward movement of the vehicle, and the axles thereof and the jack blocks gradually meet each other, and the vehicle comes to rest in jacked up position without having been in any way subjected to jolts or abrupt engagements. The bumper springs yieldingly brake the jack blocks with their load immediately after jacking position has been reached, and upon recoil the spring latches catch the front axle jacks and lock the vehicle in jacked position without any severe jolts or strains. A perfectly smooth tread surface is provided for the vehicle over the track members, and the clearance space 45 for the rear wheels is automatically provided after the front wheels have passed over the removable sections 42.

When the vehicle is in supported position on the jack blocks the rear wheel jack blocks are preferably vertical, while the front wheel blocks have preferably a slight incline rearwardly, so that when the latch bars 28 are withdrawn from the blocks 19' the vehicle, due to its weight, will swing the blocks downwardly back into the intermediate position illustrated in Fig. 5 into engagement with the ends 34ᵇ of the rock frames 34. As soon as the vehicle reaches the track it can be started rearwardly by its own power, and the wheels rolling over the rock frames will actuate the shaft 36 to thereby cause the removable sections 42 to be reinserted in the track members, so that the front wheels can roll smoothly over uninterrupted track. Upon actuation of shaft 36 the rods 38 and 55 are also shifted outwardly to carry the jam nuts thereon away from the sleeves, so that the jack blocks can be swung toward their initial lower position, first by the axles which will engage the plates 25 and 25' for a distance after the vehicle first strikes the track, and then due to their own weight. The release of the vehicle from the jack blocks is also accomplished without in any way jarring or straining the machine.

In order to simultaneously release the two spring latches 28 from the jack posts 19' I provide a controlling lever 59 pivoted at its lower end to the base member 14 adjacent the front axle jack blocks, a chain 60 leading from an intermediate point of the lever to one end of a beam 61 pivoted at an intermediate point 62 to a standard 63 mounted on a cross bar 64. The inner end of the beam 61 is connected by a chain 65 with the spring latch 28 adjacent the lever 59, while the beam at a point between its pivot 62 and its outer end is connected by a chain 66 with the opposite latch bar 28. With this arrangement, when the lever 59 is swung the beam 61 will be rotated to simultaneously pull inwardly the latch bars 28 to release the cam posts 19'. As the jack supporting bases 14 and 15 are adjustable, the cross bar 64 is preferably in two parts, whose ends over-lap and are secured together in adjusted position by bolts 67. Upon such adjustment the various chains can be readily lengthened or shortened. The vehicle can thus by its own power be run up onto the tracks and will automatically set itself on the jack blocks, and to again release the vehicle, all that is necessary is to actuate lever 59 to allow the vehicle to reëngage the track and then to back the vehicle by its own power from the tracks. In order that the tracks may be more readily engaged and the vehicle prevented from colliding with the various jack members and controlling mechanisms guide cleats or strips 68 can be secured to the tracks and the approaches adjacent the inner edges thereof.

I thus provide jack mechanism for vehicles which is controlled by the movement of the vehicle to cause suspension of the vehicle to free its wheels and the tires from the weight of the vehicle. By the actuation of a single lever the vehicle will be released and can by its own power be removed from the jack mechanism. Engagement of the vehicle with the jack members and also release of the vehicle therefrom are accomplished without in any way subjecting the vehicle to harmful jolts or strains. The stopping of the vehicle after engagement thereof on the jack members is not abrupt, but is cushioned by spring brake or bumper mechanism. The jack mechanism is universally adjustable to adapt itself for various wheel base distances and for various wheel diameters, and if desired it could also be made adjustable for various gage distances by having the cross bars 12 adjustably over-lapped instead of being fixed.

I do not desire to be limited to the precise form, construction and arrangement shown, as changes are possible which would still come within the scope of my invention, and I therefore claim the following:

1. In automobile jack mechanism, the combination of parallel track members, supporting members within and parallel with the track members and adjustable away from or toward each other, and jack members pivoted to said supporting members to automatically engage with and to receive the axles of a vehicle approaching on said track members.

2. In jack mechanism for vehicles, the combination of two parallel track members over which the vehicle may be run, supporting members parallel with and within the track members and adjustable away from or toward each other, jack blocks pivoted to the supporting members and adapted to be swung upwardly to receive the axles of the vehicle and to suspend the vehicle clear of the track members, and lock mechanism automatically controlled to lock the vehicle in suspended position on said jack block.

3. In jack mechanism for vehicles, the combination of two parallel track members over which the vehicle may be run, supporting members parallel with and within the track members and adjustable away from or toward each other, jack blocks pivoted to the supporting members and adapted to be swung upwardly to receive the axles of the vehicle and to suspend the vehicle clear of the track members, and lock mechanism automatically controlled upon movement of the jack blocks to engage the jack blocks to lock the vehicle in suspended position on said blocks.

4. In vehicle jack mechanism, the combination of parallel track members for receiving the wheels of a vehicle, a set of jack blocks pivoted adjacent the track members to be swung to receive and to suspend the front axle of the vehicle, a set of jack blocks pivoted adjacent the track members to be swung to receive and suspend the rear axle of the vehicle, means controlled by the movement of the vehicle to effect swinging of the jack blocks and suspending engagement thereof with the axles, latch mechanism coöperating with one set of jack blocks to lock said blocks in raised position after the vehicle has become suspended on the blocks, and means for releasing said latch mechanism.

5. In jack mechanism for vehicles, the combination of parallel track members for receiving the wheels of the vehicle, a set of front jack blocks pivoted adjacent either side of said track members, a set of rear jack blocks pivoted adjacent the inner sides of the track members, connecting mechanism between said jack blocks, controlling members for said connecting mechanism disposed in the path of the front wheels of the vehicle passing over the track members, engagement of the front wheels with said controlling members causing actuation of said connecting mechanism to swing the front and rear jack blocks upwardly toward the advancing axles to carry the ends of the blocks into position for receiving the axles, each track member adjacent each jack block having a clearance space provided therein, the wheels upon further movement of the vehicle tending to enter said clearance spaces and the consequent downward and forward movement of the axles causing the jack blocks to be carried by the axles into their uppermost position and in engagement with the axles to suspend the vehicle with the wheels in position over said clearance spaces, and means for locking said jack blocks in their uppermost position.

6. In jack mechanism for vehicles, the combination of two parallel track members for receiving the wheels of a vehicle, front jack blocks pivoted at their lower ends adjacent the inner sides of said track members, rear jack blocks pivoted at their lower ends adjacent the inner sides of said track members, said blocks being normally inclined rearwardly below the level of the axles of the vehicle to be received, each track member having a removable section adjacent the rear jack block, actuating members arranged in the path of the front wheels of the vehicle passing over the track members, connecting mechanism for translating movement of said controlling members to the jack blocks and to the removable track sections, engagement of the front wheels of the vehicle with said controlling members upon entrance of the vehicle over said track members causing actuation of the connecting mechanism to shift the movable track sections to leave clearance spaces adjacent the rear jack blocks, said actuation of the connecting mechanism also causing the jack blocks to be raised into an intermediate position with their ends adjacent the axles so that upon further movement of the axles the jack blocks will be raised in their final upward position, the track members being provided with clearance spaces adjacent the front jack blocks, the vehicle wheels tending to enter the front and rear clearance spaces upon further movement of the vehicle after actuation thereby of said controlling members, entrance of the vehicle wheels into said clearance spaces causing the axles to advance and to drop whereby said jack posts are raised to their final upward positions and the axles received thereby to suspend the vehicle when the wheels reach a position over the clearance spaces.

7. In jack mechanism for vehicles, the combination of parallel track members for receiving the vehicle to be suspended, front jack blocks pivoted at their lower ends adjacent the inner sides of the track members to receive the front axle of the vehicle, rear jack blocks pivoted at their lower ends adjacent the inner sides of the track members to receive the rear axle of the vehicle, a clearance pocket provided in the track member adjacent each jack block below the tread surface of the track member, the distance of the top engaging surface of each jack block from the tread surface of the track members being, when the jack blocks are in their uppermost position, no greater than the radius of the wheels of the vehicle, said jack blocks being normally inclined rearwardly below the level of the axles, means controlled by the movement of the vehicle over the track members to raise the jack blocks upwardly to an intermediate position with their top surfaces in advance of the axles, the wheels for this position being at the brinks of the clearance pockets whereby further movement of the vehicle will bring the wheels over the clearance pockets, said jack blocks being swung upwardly by the engagement of the forwardly moving axles therewith without causing raising of the axles, the tops of the swinging jack blocks meeting the axles to suspend the vehicle when the wheels reach positions midway over the clearance pockets.

8. In jack mechanism for vehicles, the combination of track members for receiving the vehicle to be suspended, jack blocks pivoted adjacent the track members to receive the axles of the vehicle, said jack members being normally inclined below the level of the axles, means controlled by the movement of the vehicle over the track members to partly raise the jack blocks into position to receive the axles, and means adapted upon further movement of the vehicle to cause the jack blocks to receive and to suspend the axles without raising of the axles above their normal level.

9. In jack mechanism for vehicles, the combination of track members for receiving the vehicle to be suspended, jack blocks pivoted adjacent the track members to receive the axles of the vehicle, said jack blocks being normally inclined below the level of the axles, means controlled by the movement of the vehicle over the track members to partly raise the jack blocks into position to receive the axles, means adapted upon further movement of the vehicle to cause the jack blocks to receive and to suspend the axles without raising of the axles above their normal level, and clearance pockets formed in the track members adjacent the jack blocks to be in position below the wheels when the axles are suspended from the jack blocks.

10. In jack mechanism for vehicles, the combination of track members for receiving the wheels of the vehicle, front jack blocks pivoted adjacent the track members to receive the front axle of the vehicle, rear jack blocks pivoted adjacent the track members to receive the rear axle of the vehicle, said jack blocks being normally inclined below the level of the axles of the vehicle entering said track members, means controlled by the movement of the vehicle over the track members for causing said jack blocks to be raised into position directly in front of the axles to be in position to receive the axles, means whereby further movement of the vehicle will cause the axles to engage with the jack blocks to be suspended from said jack blocks without raising the axles, and a clearance pocket formed in the track member adjacent each front jack block, the section of the track adjacent each rear jack block being removable to leave a clearance space, the means controlling the raising of the jack blocks serving also to cause movement of the movable track section, said clearance pockets being below the wheels when said axles are in suspended position on said jack blocks.

11. In jack mechanism for vehicles, the combination of track members for receiving the wheels of the vehicle to be suspended, a set of jack blocks pivoted adjacent the track members to receive the front axle of the vehicle, a second set of jack blocks pivoted adjacent the track members to receive the rear axle of the vehicle, means controlled by the movement of the vehicle for causing engagement of the vehicle axles and said jack blocks to suspend the vehicle, latches arranged to engage with one set of jack blocks when said axles become suspended on the jack blocks whereby said vehicle is locked against leaving the jack blocks, and lever mechanism adapted to be actuated to release the latches from said jack blocks.

In witness whereof, I hereunto subscribe my name this 1st day of October, A. D., 1910.

LUTHER C. GRACY.

Witnesses:
J. C. ADKINS,
O. E. BAYNARD.